United States Patent [19]
Kirchner et al.

[11] Patent Number: 5,715,289
[45] Date of Patent: Feb. 3, 1998

[54] RACK FOR NUCLEAR FUEL ASSEMBLIES, MAINLY COMPRISING A SINGLE BUNDLE OF CONTIGUOUS TUBES

[75] Inventors: Bernard Kirchner, Yvette; Pierre Malesys, Saint Leger, both of France

[73] Assignee: Transnucleaire S.A., Paris, France

[21] Appl. No.: 700,433

[22] PCT Filed: Mar. 22, 1994

[86] PCT No.: PCT/FR94/00312

§ 371 Date: Sep. 5, 1996

§ 102(e) Date: Sep. 5, 1996

[87] PCT Pub. No.: WO95/26030

PCT Pub. Date: Sep. 28, 1995

[51] Int. Cl.[6] .................... G21C 19/07; G21F 5/012
[52] U.S. Cl. ................................................ 376/272
[58] Field of Search .................. 376/272; 250/506.1, 250/507.1

[56] References Cited

U.S. PATENT DOCUMENTS

| | | | |
|---|---|---|---|
| 4,203,038 | 5/1980 | Takahashi et al. | 376/272 |
| 5,032,348 | 7/1991 | Blum et al. | 376/272 |

FOREIGN PATENT DOCUMENTS

| | | |
|---|---|---|
| 128785 | 12/1984 | European Pat. Off. . |
| 329581 | 8/1989 | European Pat. Off. . |
| 8400864 | 3/1984 | Netherlands . |

*Primary Examiner*—Daniel D. Wasil
*Attorney, Agent, or Firm*—Dennison, Meserole, Pollack & Scheiner

[57] ABSTRACT

A nuclear fuel assembly storage rack comprising a plurality of identical juxtaposed elongated mutually parallel tubes forming cells for receiving the assemblies. The cells having walls made of a material containing a neutron absorbing element. The tubes being straight and in mutual contact in the lengthwise direction to form a compact bundle which is held together by one or more straps distributed along the length of said bundle.

11 Claims, 4 Drawing Sheets

RACK FOR NUCLEAR FUEL ASSEMBLIES, MAINLY COMPRISING A SINGLE BUNDLE OF CONTIGUOUS TUBES

FIELD OF THE INVENTION

The invention concerns a rack for nuclear fuel assemblies, constituted by a plurality of very long contiguous cells, each of which being capable of holding a fuel assembly or the rods of several fuel assemblies following consolidation.

These racks are intended for the storage or transport of fuel assemblies which may or may not be in shielded containers; they are particularly suitable for irradiated fuel, but are also perfectly suited for use with new fuel; they can be used in dry or wet media, for example when storing fuel in the cooling pool or during their temporary storage in cement structures, or even during final storage by burial in geological strata.

STATE OF THE ART

A number of racks with cell-like construction are known for nuclear fuel assemblies. They must simultaneously carry out the following three functions:

the criticality of the assemblies arranged therein must be controlled, dry or in the presence of water in the liquid or gaseous state (the water can contain neutrophages, for example boron based);

heat transfer, to remove the heat released from irradiated assemblies;

sufficient mechanical strength to satisfy the following two conditions: (i) retain the geometry of the rack when filled with assemblies and prevent deterioration of the fuel rods during normal use (handling, transport...), (ii) control the criticality by retaining the geometry of the rack even under accidental conditions (severe shock and drops) in accordance with the current rules.

The racks are sometimes designed to provide complementary shielding against radiation, for use in certain applications.

A number of types of rack have been developed for use with assemblies used in different reactor types: light water (PWR, BWR, VVER . . .), graphite (UNGG, MAGNOX, AGR, RBMK, . . .), heavy water (CANDU . . .), fast neutron, research reactors . . .

The cell walls in those racks are generally made from a combination of several materials, each carrying out at least one of the three functions cited above.

The principal materials used are generally stainless steel or aluminium (or their alloys) for mechanical strength, aluminium or copper (or their alloys) for heat transfer, boron compounds (such as B4C based glasses), or copper, aluminium or stainless steel alloys containing boron to control criticality. The criticality function can also be carried out by using spaces in the cell walls of the rack which are of suitable thickness and fill or empty with water simultaneously with the cells containing the fuel medium.

The walls are often constituted by:

composite sandwich type walls containing successive layers of these materials sandwiched together, each layer carrying out at least one of the functions; or walls formed by juxtaposing, in the longitudinal direction, base components (generally profiles) made from these materials; in one wall between the cells, a succession of base components of different materials can be seen in the longitudinal direction, each carrying out at least one of the functions. An arrangement such as this is illustrated in French patents FR-A 2 627 622 and FR-A-2 650 113 .

In these patents, the juxtaposed base components constituting the walls between the cells are profiles of a standard material which are regularly juxtaposed and interlocked perpendicular to the axis of the cells and held in position relative to each other; these profiles may be of stainless steel, aluminium alloy, copper, etc. . . to carry out the mechanical strength and heat transfer functions, the criticality function being carried out by rods of neutrophage neutron absorbing material inserted in the walls and/or by identical shaped profiles of neutrophage material inserted in the lattice.

FIG. 6 of French patent FR-A-2 627 622 , for example, shows walls between the cells which are constituted by a juxtaposition of notched strips which cooperate with each other to interlock the strips and fix them relative to each other, producing cells which resemble separators for bottles in boxes. This juxtaposition alternates strips of neutrophage material (to carry out the criticality function) and standard material strips (to carry out the mechanical strength and heat transfer functions). This rack is designed not to deform under accidental severe conditions such as those described in the IAEA (International Atomic Energy Agency) rules governing the transport of radioactive material.

Rather than use a combination of different materials to form the walls between the cells, we developed a rack constituted by interlocked strips as shown in said FIG. 6, but with strips which are all identical and are constituted by a single multifunctional material containing a neutrophage element.

This solution means that a rack can be designed which has a mechanical strength which is limited to that required For handling and transport of fuel assemblies under normal conditions; in particular, it does not need to have the mechanical strength to withstand shocks and severe accidental drops as required by the law; in fact, a rack in which the walls located directly adjacent the active portion are constructed entirely from a neutrophage material guarantees sub-criticality even in the event of a large deformation. Certification of such a rack does not require its mechanical strength to be tested for severe drops or shocks, which is of advantage.

This rack, generally constructed of aluminium or boron, developed from the viewpoint of ensuring criticality control, heat transfer and mechanical strength under normal handling or transport conditions, does not require the mechanical strength function in the event of a severe accident, meaning that the thickness of the walls between the cells can be limited and thus the capacity available for the fuel assemblies can be increased.

However, this type of juxtaposition of strips requires the notches to be machined to mutually cooperate during assembly of the rack and provide its rigidity; this has a number of drawbacks:

the machining must be very precise and the assembly allowance must be small so that the strips align perfectly and the cell walls are perfectly smooth so as not to cause any snagging when the fuel assemblies are loaded; this precision machining is difficult and costly;

because of the small assembly allowance, assembling the strips by slotting them together can be difficult;

finally, the presence of the notches has to be compensated by extra thickness of the strips to ensure that the required functions are properly fulfilled (mechanical strength and heat transfer). Because of these drawbacks, we have sought to further simplify the construction of the racks, in particular to avoid machining the notches and the difficult assembly process fop the strips, while retaining or improving the storage capacity of the fuel assemblies.

DESCRIPTION OF THE INVENTION

Figure 1:
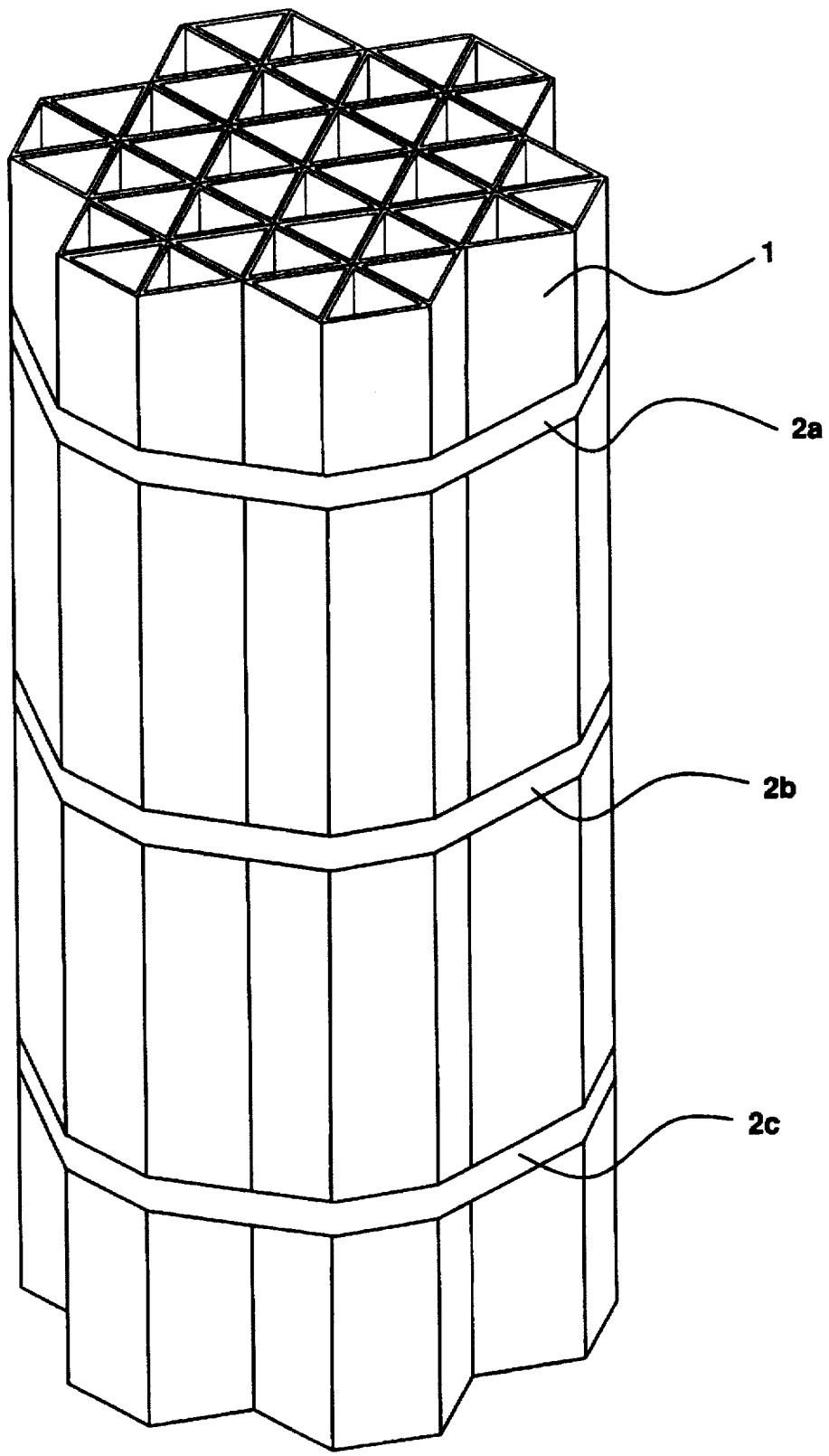
FIG. 1 shows tubes with an equilateral triangular cross section.

The invention relates to a rack for nuclear fuel assemblies constituted by a plurality of very long cells which are adjacent and parallel to each other to receive said assemblies, the walls of said cells being formed from a material containing a neutrophage element, characterised in that it is substantially comprised of a plurality of very long, identical rectilinear tubes which constitute the cells and which are parallel to each other, juxtaposed and in contact with each other along their long length to form a compact bundle which is held in this configuration by one or more tightening straps distributed along the length of said bundle. The rack thus has the appearance of a faggot of identical tubes which are bound together, each tube being suitable for receipt of a fuel assembly.

The tubes are prismatic or cylindrical with a cross section which generally corresponds to that of the assembly to be placed therein. This cross section can be an equilateral triangle, square, rectangular, or hexagonal, to allow the tube faces to come into contact with each other to provide for heat transfer.

Circular cross section tubes can also be used. Contact is made along the generatrices, which is occasionally sufficient especially in a wet medium where effective heat transfer can occur by convection in the fluid filling the rack.

The tube length generally corresponds to that of the assemblies to be arranged therein, or at least to the length of the active portion.

It should be noted that in the racks of the prior art, continuity of the constituent material of the rack in the radial direction was sought in order to favour heat transfer from the centre of the rack towards its periphery. Unexpectedly, despite the fact that there is no radial continuity in the rack of the invention, only longitudinal continuity, there is excellent radial heat transfer due to the interference fit produced by the simple straps stretched around the juxtaposed tubes which are face to face in contact with each other.

The tubes are advantageously produced by normal extrusion techniques, which is a major element in simplifying the manufacture of the rack and reducing its cost without adversely affecting its other characteristics. They may, however, also be produced by any other known procedure, for example bending and/or welding, forming, etc . . . .

The tubes ape normally homogeneous and made from a single material, generally a metal or metal alloy containing a neutrophage element or compound and with mechanical characteristics which can resist loading with fuel assemblies under normal handling and transport conditions, and/or optionally, good thermal conductivity for applications requiring efficient radial heat transfer.

Depending on the application, the metal or alloy can be selected from steels (ordinary, stainless or special), magnesium, copper, titanium or their alloys, etc. The neutrophage compound can be based on Cd, Gd, Hf, In, Li, B, etc. Stainless steel containing boron is particularly indicated when a long period in a wet medium is intended, while for long-term dry storage, aluminium or an aluminium alloy cg boron is preferred because of its much higher thermal conductivity compared with that of steels.

It should be noted that, since the rack is only intended to provide limited mechanical strength to hold the mass of fuel assemblies under normal handling or transport conditions, it is not necessary to use a high aluminium alloy, for example, which has poorer thermal properties. A matrix of pure aluminium could be used, with better thermal conductivity. By way of example, the thermal conductivity of alloys of type AS13 used, for example, for cast articles, is about 160 W/m °C., and that of Al-Mg alloys for high mechanical strength profiles is of the order of 120 W/m °C., while that for A5 type Al (more than 99.5% pure) is of the order of 230 W/m °C.

To ensure that the rack filled with assemblies remains subcritical, the tubes contain a neutrophage material as described above. The concentration of the neutrophage material in the tubes is, of course, dependent on the type of fuel assemblies it holds; in particular, these latter may contain bars or rods of neutron poison distributed among the fuel rods inside the assembly (as in assemblies for PWER, VVER 1000 . . .).

When using a boron-based neutrophage material, this can be introduced into the metallic material in a number of different chemical forms, for example as boron aluminide if the metal is aluminium or one of its alloys. Advantageously, the boron is enriched in B10, which is an efficient neutron absorbing isotope over the whole energy spectrum; this allows the concentration in the metallic material to be reduced and prevents the properties (metallurgical, mechanical, physical . . .) from being altered. Boron-based compounds, which are generally in the form of a dispersoid in the metal (Al, for example), hardly alter the thermal characteristics.

Regarding the criticality risk, the rack of the invention has the advantage of being intrinsically safe. For reasons connected with reactor safety, nuclear fuel assemblies, usually using a $UO_2$ fuel enriched with less than 5% of $U_{235}$, or a mixed $UO_{2-PuO2}$ fuel, are generally designed to constitute an undermoderated configuration of fissile material; thus when the metal of the tubes is sufficiently long, any accidental impact which can deform the pack of the invention can only reduce the transverse distance between the fuel rods and increase the undermoderation, hence decreasing any risk of criticality. On the other hand, racks where sub criticality depends on maintaining distance or spaces between the cell walls would lead to critical excursions in the event of accidents which were abnormal and deformed the rack.

The tightening straps which hold the juxtaposed tubes in position are regularly distributed along the length of the tube bundle. Banding is generally effected using metallic bands which go around the periphery of the bundle. The tightening force can be exerted at its extremities using any known means.

The straps are generally made from a metal which is different to that of the tubes, with an expansion coefficient which is different to that of the tubes so that during heating of the pack, the cohesion and rigidity of the faggot of juxtaposed tubes and the thermal contact between the tubes is maintained or improved.

In practice, the metal for the straps is carefully selected and the tension is fixed so that the effect of the differential expansion for the maximum envisaged thermal load does not introduce excessive strains into the different components of the rack.

The lower face of the pack may rest on a rigid plate, typically of metal, provided with suitable means for handling the rack.

The field of application of the racks of the invention is very wide. They are not only adapted to different types of fuel assemblies, compacted or otherwise as already seen, but they can also be used for storage or transport of new or irradiated fuel assemblies, in dry or wet medium. Thus, for certain types of reactor, the racks of the invention can be used to transport the assemblies from the reactor to the cooling pools, from which they can be removed For placement in shielded transport vessels conforming to the appropriate laws. Racks in accordance with the invention can also be used for final burial, as they guarantee sub criticality for a period equal to their own lifetime.

It should be noted that any nuclear fuel assembly outside the reactor, when kept in the racks of the invention under any conditions during its life, from intermediate storage following manufacture to the cooling pool before reprocessing or temporary storage, even up to burial, the risk of criticality resulting from human error is completely removed.

FIGS. 1 to 4 illustrate the invention by showing different embodiments of racks in accordance with the invention.

Figure 2:
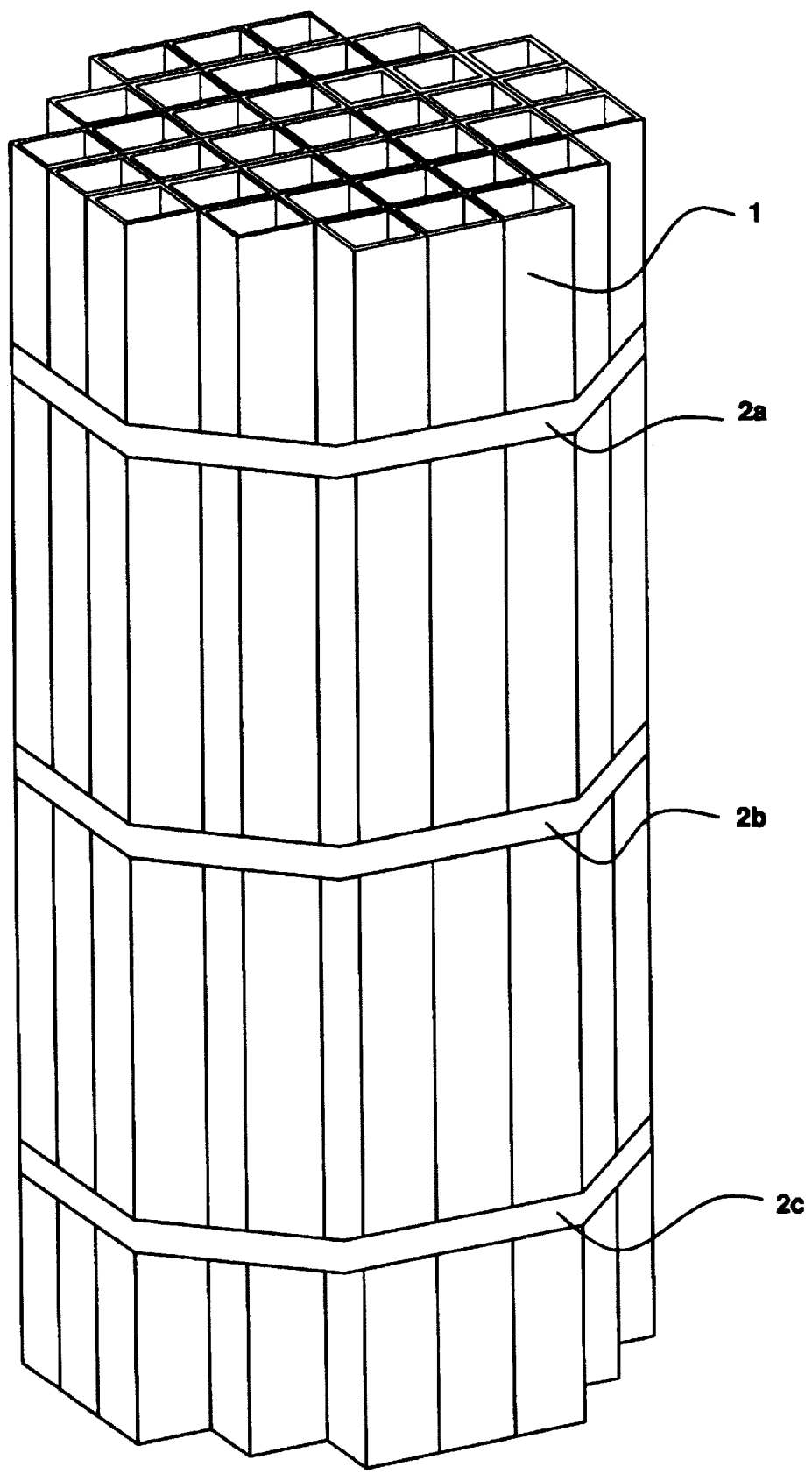
FIG. 2 shows square cross section tubes.
Figure 3:
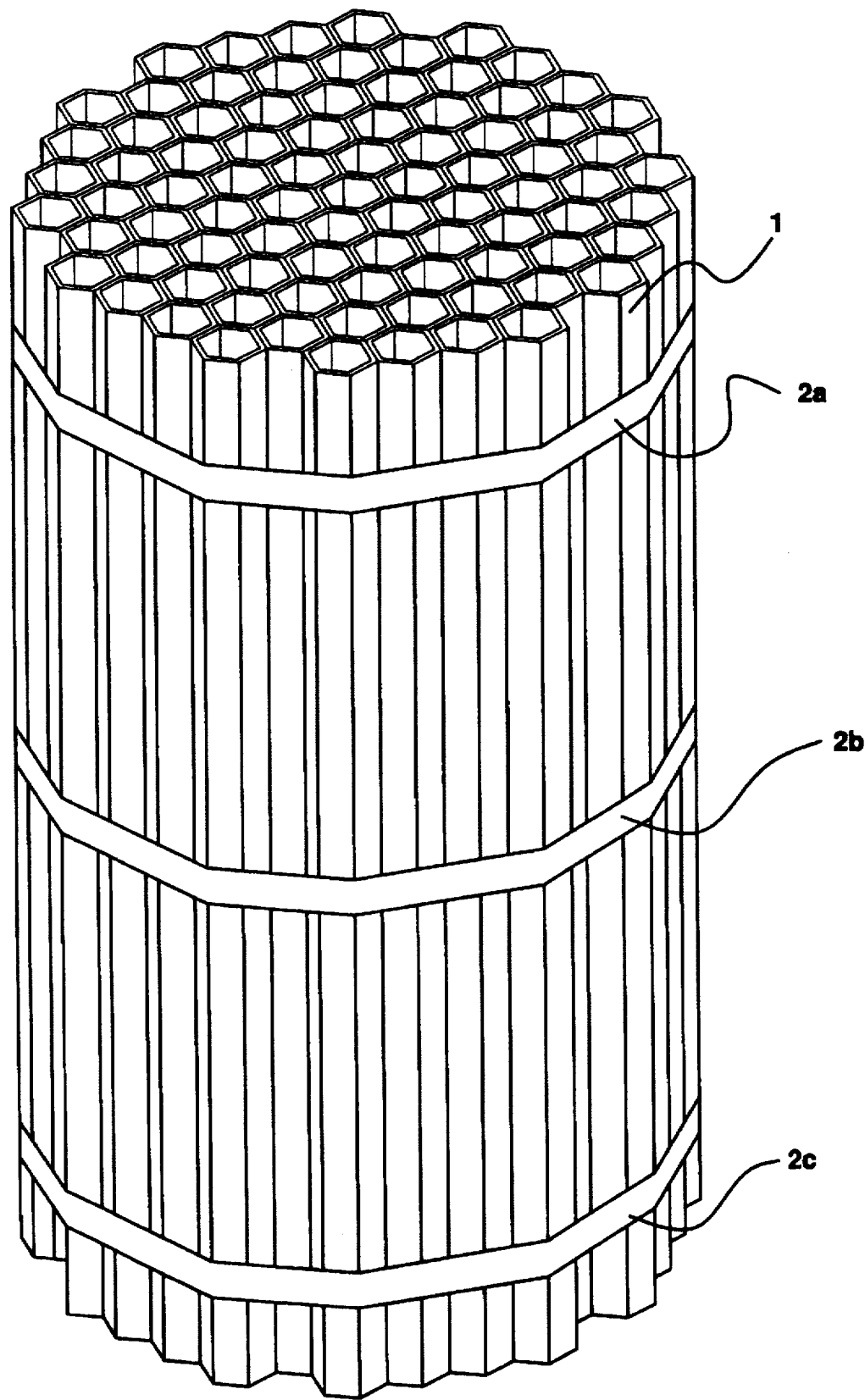
FIG. 3 shows hexagonal cross section tubes.
Figure 4:
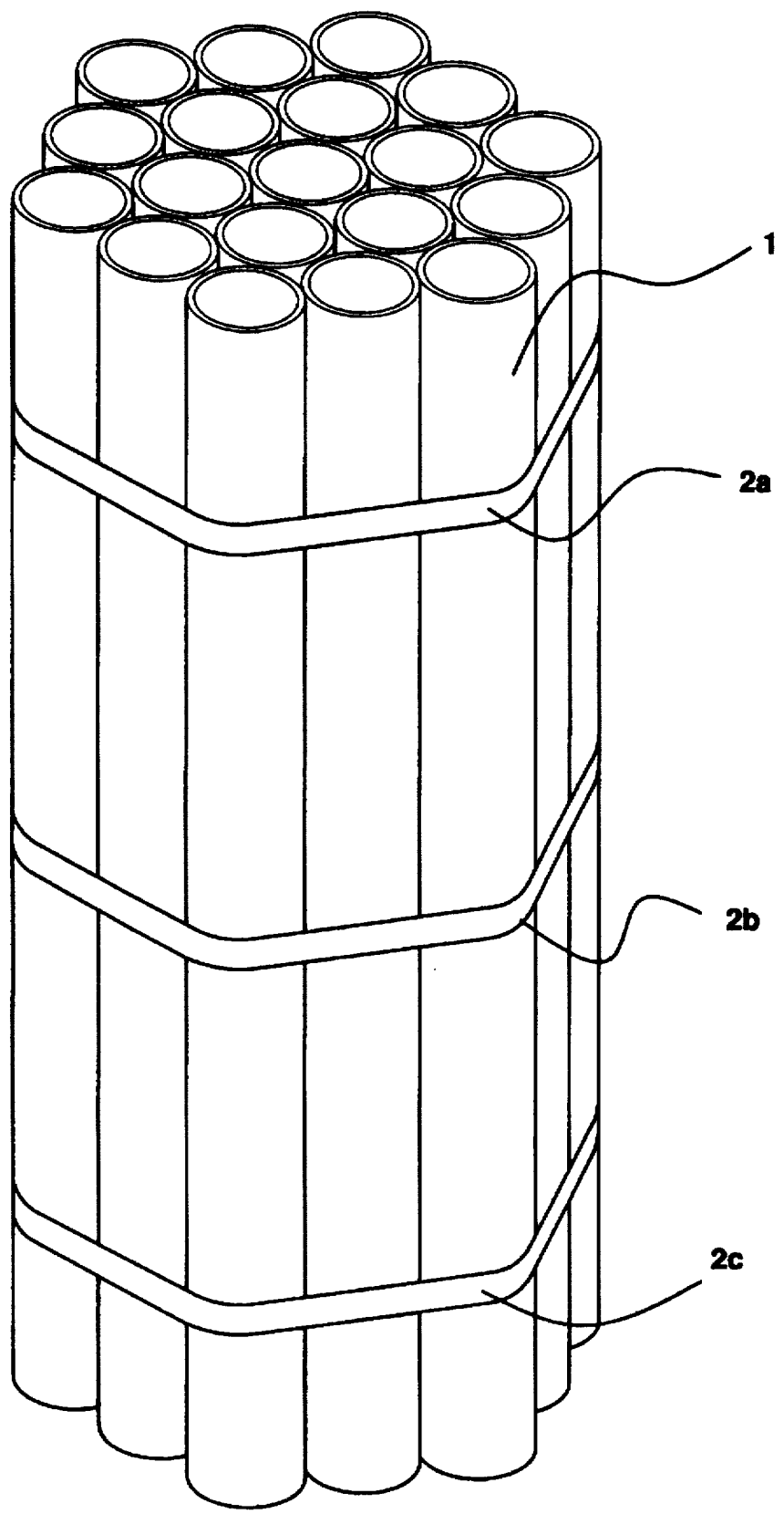
FIG. 4 shows circular cross section tubes.

They only differ in the cross section of the juxtaposed tubes (1): FIG. 1 shows tubes with an equilateral triangular cross section, FIG. 2 shows square cross section tubes, FIG. 3 shows hexagonal cross section tubes, and FIG. 4 shows circular cross section tubes.

In each of FIGS. 1 to 4, the bundle of tubes is held by three straps (2a, 2b, 2c) in which the tightening system is not shown.

We claim:

1. A rack for holding nuclear fuel assemblies, comprising a plurality of identical juxtaposed elongated mutually parallel tubes forming cells for receiving the assemblies, said cells having walls made of a material containing a neutron absorbing element, said tubes being straight and in mutual contact in the lengthwise direction to form a compact bundle which is held together by one or more straps distributed along the length of said bundle.

2. A rack according to claim 1, characterised in that the tubes have a regular polygonal or circular cross section.

3. A rack according to claim 2, characterised in that the polygonal cross section is an equilateral triangle, square, rectangle or hexagon.

4. A rack according to claim 1, characterised in that the walls further comprise a material selected from the group consisting of steel, copper, magnesium, titanium, aluminum, and alloys thereof.

5. A rack according to claim 1, characterised in that the neutron absorbing element is boron based.

6. A rack according to claim 5, characterised in that the boron is enriched in B10.

7. A rack according to claim 1, characterised in that the material of the tubes is aluminium containing boron or stainless steel containing boron.

8. A rack according to claim 1, characterised in that the fuel assemblies arranged in said rack contain bars or rods of neutron absorbing material inserted in guide tubes distributed among the fuel rods.

9. A rack according to claim 1, characterised in that the tightening strap is of metal with an expansion coefficient which is different to that of the tube material so that, during heating of the rack, the cohesion and rigidity of the tube bundle and the thermal contact between the tubes is maintained or improved.

10. A rack according to claim 1, characterised in that its lower face rests on a rigid plate for manipulation thereof.

11. A rack according to claim 1, characterised in that it is used in a dry medium or a wet medium for storage or transport of new or irradiated fuel assemblies.

* * * * *

UNITED STATES PATENT AND TRADEMARK OFFICE
CERTIFICATE OF CORRECTION

PATENT NO. : 5,715,289
DATED : February 3, 1998
INVENTOR(S) : BERNARD KIRCHNER et al It is certified that error appears in the above-indentified patent and that said Letters Patent is hereby corrected as shown below:

Title page after [75] Inventors:

Change "Bernard Kirchner, Yvette; Pierre Malesys, Saint Leger, both of France" to --Bernard Kirchner, Gif/S/Yvette; Pierre Malesys, Boissy Saint Leger, both of France--

Signed and Sealed this

Twenty-sixth Day of May, 1998

Attest:

BRUCE LEHMAN

*Attesting Officer*  *Commissioner of Patents and Trademarks*